United States Patent [19]

Taguchi et al.

[11] Patent Number: 4,988,395

[45] Date of Patent: Jan. 29, 1991

[54] WATER-SOLUBLE SOLDERING FLUX AND PASTE SOLDER USING THE FLUX

[75] Inventors: Toshihiko Taguchi, Saitama; Shozo Asano, Kashiwa; Ken'ichi Osawa, Ichikawa; Hiroo Nagai; Hisao Ikeda, both of Funabashi, all of Japan

[73] Assignees: Senju Metal Industry Co., Ltd.; Nissan Chemical Industries Ltd., both of Tokyo, Japan

[21] Appl. No.: 472,522

[22] Filed: Jan. 30, 1990

[30] Foreign Application Priority Data

Jan. 31, 1989 [JP] Japan ................................ 1-21801
Jun. 8, 1989 [JP] Japan ............................... 1-144264
Jun. 15, 1989 [JP] Japan ............................... 1-150653

[51] Int. Cl.$^5$ ............................................. B23K 34/35
[52] U.S. Cl. ........................................ 148/24; 148/23; 148/25
[58] Field of Search ................................... 148/23–25

[56] References Cited

U.S. PATENT DOCUMENTS

| 3,791,027 | 2/1974 | Angelo et al. | 148/23 |
| 3,847,767 | 11/1974 | Kloczewski | 204/159.14 |
| 3,895,973 | 7/1975 | Stayner | 148/25 |
| 3,944,123 | 3/1976 | Jacobs | 148/25 |
| 4,168,996 | 9/1979 | Zado | 148/25 |
| 4,194,931 | 3/1980 | Zado | 148/25 |
| 4,216,035 | 8/1980 | Bakos | 148/25 |
| 4,342,607 | 8/1982 | Zado | 148/25 |

FOREIGN PATENT DOCUMENTS 2198676  6/1988  United Kingdom .

*Primary Examiner*—Peter D. Rosenberg
*Attorney, Agent, or Firm*—Sughrue, Mion, Zinn, Macpeak & Seas

[57] ABSTRACT

A water-soluble soldering flux and paste solder using the flux are disclosed, the flux comprising, as a main fluxing agent, a resinous reaction product of at least one carboxyl-containing compound having 8 or less carbon atoms, selected from the group consisting of monocarboxylic acids, polycarboxylic acids, and hydroxy-carboxylic acids with tris-(2,3-epoxypropyl)-isocyanurate.

17 Claims, No Drawings

WATER-SOLUBLE SOLDERING FLUX AND PASTE SOLDER USING THE FLUX

BACKGROUND OF THE INVENTION

The present invention relates to water-soluble soldering flux and paste solder using the flux, particularly to water-soluble soldering flux and paste solder for use in soldering electronic parts to a printed circuit board.

Soldering flux which is used for soldering electronic parts usually comprises rosin as the main component. Such a rosin-containing flux has good solderability, and the flux residue after soldering is electrically insulating. It is also non-corrosive and non-toxic. However, sometimes it is necessary to wash-off the flux residues after soldering, since rosin is sticky and attracts dust and foreign particles, resulting in a degradation in the electrical insulating properties, especially when the particles absorb moisture. Therefore, flux residues are usually washed off with an organic solvent such as "Chlorothene (tradename)" and "Freon (tradename)".

Paste solder is also used for soldering electronic parts to a printed circuit board. The paste solder is prepared by combining solder powder with a flux composition. A suitable amount of paste solder is first applied to given areas on the board by means of screen printing or dispensers. Electronic parts are mounted on the paste solder and the printed circuit board is then heated to reflow the solder by means of a reflow furnace, a hot plate, a blow of hot gas, a laser hot steam, and the like.

In general, the following properties are required of paste solder:

(1) Suitable viscosity and good printability;
(2) Good solderability;
(3) Non-toxicity and odorlessness; and
(4) Constant viscosity and non-skinning even after a long period of storage.

Recently, as electronic equipment becomes smaller in size and higher in packaging density, land patterns on printed circuit boards are becoming finer and the distance between the neighboring lands are becoming smaller. Therefore, paste solder which is used for electronic equipment must have improved printability, ability of being washed off, and reliability.

Soldering flux and paste solder are classified into an oil-soluble type in which rosin is used as a base fluxing material, and a water-soluble type in which a water-soluble composition such as glycerin, polyethylene glycol, polypropylene glycol, or diethylene glycol is used as a base material.

After soldering, flux residues must be removed, and water and an organic solvent such as Chlorothene (tradename) and Freon (tradename) are used for the water-soluble type and the oil-soluble type, respectively.

Today however, strict environmental and health regulations restrict the use of organic solvents. Therefore, it is highly desirable to be able to use water as a cleaning agent instead of organic solvents.

Water has the following advantages as a cleaning agent:

(i) Water is non-combustible and is very easy to handle.
(ii) Water causes no environmental disruption.
(iii) Water is cheaper than any organic solvents.
(iv) Water is the best solvent for ionic substances such as the activators used in soldering fluxes.

Several types of water-soluble soldering fluxes are known including inorganic compounds such as zinc chloride and ammonium chloride dissolved in glycerin or vaseline and organic compounds such as formic acid and ammonium formate in an aqueous solvent. However, a water-soluble flux which contains organic salts is so active that corrosion easily occurs even if a very small amount of residues remains. Therefore, it is necessary to wash the flux extremely thoroughly. Fluxes which employ glycerin and vaseline as solvents are difficult to wash off with water when they are heated to high temperatures during soldering.

Furthermore, in case of paste solder, most of requirements (1)–(4) mentioned above can be satisfied by commercially-available oil-soluble paste solders. In contrast, water-soluble paste solders do not have satisfactory paintability and are difficult to wash off. These problems are mainly caused by a base carrier. Namely, oil-soluble paste solders use rosin as a base carrier, but there has not yet been found a base carrier for water-soluble paste solders which has the satisfactory properties of oil-soluble paste solders using rosin.

Water-soluble paste solders now available use polyethylene glycol and polypropylene glycol as a base carrier. However, such water-soluble paste solders do not roll but instead slide laterally when moved on a screen with a squeegee, and the solder does not thoroughly fill the openings of the screen, resulting in a degradation in printability. This is because the paste does not have satisfactory viscosity and tack.

SUMMARY OF THE INVENTION

An object of the present invention is to provide a water-soluble soldering flux and paste solder using the flux, the residues thereof being able to be easily washed off, after soldering, with water, but without the use of an organic solvent such as Freon.

Another object of the present invention is to provide a preflux for use in soldering electronic parts.

According to the findings of the inventors of the present invention a reaction product of tris-(2,3-epoxypropyl)isocyanurate (hereunder referred to as "TEPIC") with a carboxyl group-containing compound can satisfy such requirements.

Thus, the present invention is a soldering flux which comprises, as a main fluxing agent a resinous reaction product of a compound containing one or more carboxyl groups and having 8 or less carbon atoms, selected from the group consisting of monocarboxylic acids, polycarboxylic acids, and hydroxy-carboxylic acids with tris-(2,3-epoxypropyl)isocyanurate (TEPIC), and an activating agent.

In another aspect, the present invention is a paste solder which comprises solder powder blended with a flux which is a resinous reaction product of a compound containing one or more carboxyl groups and having 8 or less carbon atoms, selected from the group consisting of monocarboxylic acids, polycarboxylic acids, and hydroxy-carboxylic acids with TEPIC.

The resinous reaction product may also be used as a preflux which is applied to a circuit board for protecting the copper circuit from corrosion and keeping it clean.

DESCRIPTION OF THE PREFERRED EMBODIMENTS

According to the present invention the flux components which remain after soldering can be easily washed off, and the resinous substances used as flux components must be water-soluble and also be soluble in organic solvents which are used in the paste solder. That is, the resinous substance must be amphiphatic. In addition, the resinous substance must not be decomposed when heated during soldering.

It is desirable that the resinous substance be a reaction product of TEPIC with one or more of the following carboxyl-containing compounds (hereunder referred to as "carboxylic acids"):

(1) Monocarboxylic acids having 8 or less carbon atoms;

(2) Hydroxy-carboxylic acids containing a hydroxyl and carboxyl groups and having 8 or less carbon atoms; and (3) Polycarboxylic acids containing two or more carboxyl groups and having 8 or more carbon atoms.

The reaction between TEPIC and the carboxylic acids is an addition of the carboxyl group of the carboxylic acids to the epoxy groups of the TEPIC and the reaction product contains ester groups and hydroxyl groups. Therefore, even when the starting carboxylic acids do not have hydroxyl groups, the resulting reaction product contains hydroxyl groups which render the reaction product water-soluble.

On the other hand, alkyl groups which are contained in the carboxylic acid give the reaction product solvent-solubility.

However, when each of the carboxylic acids has more than 8 carbon atoms, the water-solubility of the reaction products is markedly decreased, although the solvent-solubility is not influenced at all. Thus, according to the present invention the maximum carbon atoms each of the carboxylic acids is 8.

Examples of the monocarboxylic acids mentioned in (1) are formic acid, acetic acid, propionic acid, butyric acid, isobutyric acid, valeric acid, isovaleric acid, caproic acid, enanthic acid, and caprylic acid.

Examples of the hydroxy-carboxylic acids mentioned in (2) are glycolic acid, lactic acid, hydroxy-butyric acid, and hydroxy-valeric acid.

Examples of the polycarboxylic acids mentioned in (3) are oxalic acid, malonic acid, succinic acid, glutaric acid, adipic acid, pimelic acid, and suberic acid.

Examples of the hydroxy-carboxylic acids mentioned in (2) which are also the polycarboxylic acids mentioned in (3) are malic acid, citric acid, tartaric acid, and hydroxy-malonic acid.

However, it is to be noted that the carboxylic acids which can be used in the present invention are not limited to the above-listed compounds. As long as the intended effect can be obtained, any of the carboxylic acids defined in (1), (2), and (3) can be used in the present invention.

One or more of the carboxylic acids are reacted with tris-(2.3-epoxypropyl)-isocyanurate (TEPIC) to obtain resinous substance. TEPIC is a compound having the following structural formula:

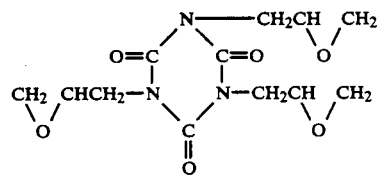

The reaction product of TEPIC with the carboxylic acids (hereunder referred to merely as "RCOOH") can be shown by the following general formula:

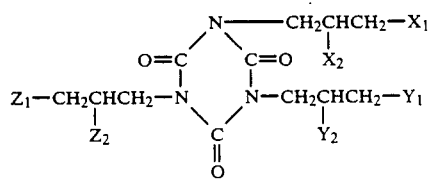

wherein one of $X_1$ and $X_2$ is a carboxylic acid residue (RCOO—), and the other one is an OH group, one of $Y_1$ and $Y_2$ is a carboxylic acid residue (RCOO—), and the other one is an OH group, and one of $Z_1$ and $Z_2$ is a carboxylic acid residue (RCOO—), and the other one is an OH-group.

An actual reaction product is thought to be a mixture of various kinds of reaction products having the above general formula. When polycarboxylic acid is used, it is thought that components which have been oligomerized to some extent are present.

When preparing the resinous reaction product, the TEPIC may be heated to higher than 130° C. to melt it, and the carboxylic acids can be directly added to the melt to react with TEPIC. The reaction may be performed in the presence of a suitable solvent and/or a reaction accelerator such as a tertiary amine. The reaction time is usually 1–10 hours. When two or more of the carboxylic acids are added, they may be commingled themselves prior to the addition to the TEPIC or they may be added one by one to a reaction mixture.

The amount of the carboxylic acids to be added is 1–6 moles of the total amount of the carboxylic acids per mole of TEPIC. Preferably the molar ratio is 1–3 moles per mole of TEPIC. This means that it is preferable that the epoxy residue be as small as possible.

According to the present invention, the reaction product is mixed with an activating agent to prepare the soldering flux of the present invention. The activating agent is not restricted to a specific one, and may be any water soluble compound selected from organic acids such as lactic acid, oleic acid, stearic acid, glutamic acid, and phthalic acid, halogen compounds such as aniline hydrochloride, glutamic acid hydrochloride, bromine compounds, and chlorine compounds, and amines or amides such as urea and ethylenediamine.

The soldering flux of the present invention may also be used as a preflux which is coated on a copper plate constituting an electric circuit of a printed circuit board. Application of a preflux to the circuit board is effective for protecting the copper circuit from corrosion and for keeping it clean during a long period of storage.

The resinous substance may also be blended with a solder powder to prepare paste solder.

There are no restrictions on the alloy type and grain size of the solder powder employed in the present invention, and powders used in conventional paste solder can be used. Some examples of the solder alloys which can be used in the present invention are Sn-Pb, Sn-Pb-Ag, Sn-Ag, Sn-Pb-Bi, and Pb-In. The grain size of these alloy powder is preferably 200–400 mesh.

The present invention will be further described in conjunction with working examples which are presented merely for illustrative purposes and do not restrict the present invention in any way.

PREPARATION 1

A flask equipped with a stirrer, a thermometer, and a cooling pipe was charged with 300 parts by weight of TEPIC [tris-(2,3-epoxypropyl)-isocyanurate of high purity manufactured by Nissan Chemical Ind. Ltd. and having an epoxy equivalent of 100 g/EQ, namely 1 gram equivalent of epoxy group per 100 g]. After melting at 140° C. the temperature was was adjusted to 130° C. While the melt was being stirred, 180 parts by weight of acetic acid were added little by little. The reaction was continued for two hours at 130° C. and then for one hour at 140° C. and maintained at that temperature for one hour.

Thereafter, the reaction mixture was gradually cooled to obtain a resinous product.

The residual epoxy content of the product could not be determined by titration with a perchloric acid solution, because it was below the limit of detection with such titration. The acid value of the product was 0.22 mol/kg.

PREPARATION 2

This preparation differed from preparation 1 in that 162 parts by weight of acetic acid were added little by little to 300 parts by weight of TEPIC, and the reaction was continued for 2 hours at 130° C. Thereafter, 27 parts by weight of lactic acid were added little by little to continue the reactions for 1 hour at 140° C. The reaction mixture was then cooled gradually to obtain a resinous reaction product.

The epoxy content of the product was too small to determine. The acid value of the product was 0.47 mol/kg.

PREPARATION 3

This preparation differed from Preparation 1 in that 150 parts by weight of acetic acid were added little by little to 300 parts by weight of TEPIC, and the reaction was continued for 1.5 hours at 130° C. Thereafter, 73 parts by weight of adipic acid were added little by little to continue the reaction for 1.5 hour at 140° C. The reaction mixture was then cooled gradually to obtain a resinous reaction product.

The epoxy content of the product was too small to determine. The acid value was 0.97 mol/kg.

PREPARATION 4

This preparation differed from Preparation 1 in that 180 parts by weight of lactic acid were added little by little to 300 parts by weight of TEPIC, and then 146 parts by weight of adipic acid were added little by little to continue the reactions for 1.5 hour at 130° C. and for 2 hours at 140° C. The reaction mixture was then cooled gradually to obtain a resinous reaction product.

The epoxy content of the product was too small to determine. The acid value of the product was 2.08 moles/kg.

Table 1 summarizes Preparation Nos. 1 through 4.

TABLE 1

| Preparation | TEPIC (Parts by weight) | Carboxylic Acid (Parts by weight) | | | Reaction Conditions | Acid Value (mol/kg) |
| --- | --- | --- | --- | --- | --- | --- |
| | | Acetic Acid | Lactic Acid | Adipic Acid | | |
| 1 Reaction Product-1 | 300 | 180 | — | — | 130° C./2 hr 140° C./1 hr | 0.22 |
| 2 Reaction Product-2 | 300 | 162 | 27 | — | 130° C./2 hr 140° C./1 hr | 0.47 |
| 3 Reaction Product-3 | 300 | 150 | — | 73 | 130° C./1.5 hr 140° C./1.5 hr | 0.97 |
| 4 Reaction Product-4 | 300 | — | 180 | 146 | 130° C./1.5 hr 140° C./2 hr | 2.08 |

EXAMPLE 1

The reaction products obtained in preparations 1–4 were mixed with activating agents to prepare the soldering fluxes shown in Table 2.

The resulting soldering fluxes were screen-printed onto a copper plate (50×50×0.3 mm), and soldering was carried out. Spreading of the solder during soldering was determined in accordance with JIS Z 3197. An alloy of Sn-Pb was used as the solder alloy.

Washability was determined by dipping the copper plate into water at 60° C. for three minutes. The state of the flux residues which remained on the surface of the copper plate and coloring of the copper plate after washing were visually observed to determine washability.

Coloring of the portion of the surface of the copper plate where flux residues remained and coloring of the copper plate after washing were visually observed.

Test results are shown in Table 3.

TABLE 2

| Formulation | (% by weight) | | | | | | | | | | | | |
| --- | --- | --- | --- | --- | --- | --- | --- | --- | --- | --- | --- | --- | --- |
| | Present Invention Run No. | | | | | | | | | | Comparative Run No. | | |
| | 1* | 2* | 3* | 4* | 5* | 6** | 7** | 8** | 9*** | 10*** | 1* | 2** | 3*** |
| Reaction Product-1 | 35 | | | 30 | | | 55 | | | 55 | | | |
| Reaction Product-2 | | 42 | | | 60 | | | 40 | | | | | |
| Reaction Product-3 | | | 40 | | | 60 | | | 90 | | | | |
| Triethanolamine HCl | 5 | | | | | | | | | 5 | | | |
| Diphenylguanidine HBr | | 8 | | | | | | | | | | | |
| Dimethylamine HCl | | | 3 | | | | | | 3 | | | | |
| Monoethanolamine | | | | 20 | | | 15 | | | | | | |
| Malic Acid | | | | 1 | | | | 2 | 2 | | | | |
| Urea | | | | 3 | | 3 | | | 5 | | | | 10 |
| Dietylene Glycol | | | | 53 | | 33 | | | | | | | |
| Lactic Acid | | | | | 2 | | 2 | | | | | | |

TABLE 2-continued

|  | (% by weight) | | | | | | | | | | | | |
|---|---|---|---|---|---|---|---|---|---|---|---|---|---|
| | Present Invention Run No. | | | | | | | | | | Comparative Run No. | | |
| Formulation | 1* | 2* | 3* | 4* | 5* | 6** | 7** | 8** | 9*** | 10*** | 1* | 2** | 3*** |
| Glycolic Acid | | | | | 2 | | | | | | | | |
| Glutamic Acid HCl | | | | | 5 | | | | | | | | |
| Diethanolamine HCl | | | | 4 | | | | | | | | | |
| Isopropyl Alcohol | 60 | | | | | | | | | | | | |
| Polyethylene Glycol #1000 | | | | | | | | 10 | | | | | |
| Polyethylene Glycol #1500 | | | | | | | | | 30 | | | 40 | |
| Polyethylene Glycol #3000 | | | | | | | | | | | | | 60 |
| Diethylamine HCl | | | | | | | | 3 | | | | | |
| Dithanolamine | | | | | | | | | | 10 | | | |
| Butyl Carbitol | | 50 | | | | | | | | | | | |
| Glycerin | | | 48 | | | | 28 | 45 | | | | 45 | |
| Water | | | | 33 | | | | | | | 76 | | |
| Zinc chloride | | | | | | | | | | | 18 | 10 | |
| Ammonium chloride | | | | | | | | | | | 6 | | |
| Potassium Chloride | | | | | | | | | | | | 5 | |
| Formic Acid | | | | | | | | | | | | | 10 |
| Ammonium Formate | | | | | | | | | | | | | 20 |

Note:
*Liquid Flux
**Paste Flux
***Solid Flux

TABLE 3

| Run No. | Spreading | Washability | Coloring of Cu Plate |
|---|---|---|---|
| 1 | >90% | O | None |
| 2 | " | O | " |
| 3 | " | O | " |
| 4 | " | O | " |
| 5 | " | O | " |
| 6 | " | O | " |
| 7 | " | O | " |
| 8 | " | O | " |
| 9 | " | O | " |
| 10 | " | O | " |
| Comparative | | | |
| 1 | " | Δ | Yes |
| 2 | " | Δ | " |
| 3 | " | X | " |

TABLE 4

| | This Invention Run No. | | | | Compar- |
|---|---|---|---|---|---|
| Formulation | 1 | 2 | 3 | 4 | ative |
| Reaction Product-1 | 5 | 10 | — | — | — |
| Reaction Product-2 | — | — | 15 | 20 | — |
| Isopropyl Alcohol | 94.7 | 89.7 | 85 | 80 | 79.5 |
| Malic Acid | 0.3 | 0.3 | — | — | — |
| Suractant | Slight | Slight | Slight | Slight | — |
| Rosin | — | — | — | — | 20 |
| Stearic Acid | — | — | — | — | 0.5 |

TABLE 5

| | This Invention Run No. | | | | Compar- |
|---|---|---|---|---|---|
| Properties | 1 | 2 | 3 | 4 | ative |
| Corrosion* | O | O | O | O | O |
| Solderability (I)** | O | O | O | O | O |
| Solderability (II)** | O | O | O | O | O |
| Washability** | O | O | O | O | X |

Note:
*O: Not corrosive;
**O: Good, X: Poor

EXAMPLE 2

In this example the flux of the present invention was used as a preflux.

The reaction products obtained in Preparations 1-2 were mixed with an activating agent in an organic solvent to prepare prefluxes as shown in Table 4.

The resulting prefluxes were tested to determine the effectiveness of the preflux of the present invention.

The test results are shown in Table 5.

The item "Corrosion" in Table 5 means whether or not the flux residues are corrosive or not.

Solderability (I) was determined as follows:

The preflux was coated onto a copper plate by a dipping method. After drying at room temperature, the plate was heated at 150° C. for 1 minute, then at 230° C. for another 1 minute, and this cycle of heating was repeated. Soldering was carried out using a water-soluble paste solder, and spreading of solder during soldering was observed to determine solderability.

Solderability (II) was determined as follows:

The preflux was coated onto a copper plate by a dipping method. After drying at room temperature it was kept in a thermostatic chamber at 40° C. at a relative humidity of 90% for 96 hours. Then, soldering was carried out using a water-soluble paste solder, and spreading of solder during soldering was observed to determine solderability.

EXAMPLE 3

Powdered solder (63% Sn-Pb, 200 mesh, spherical particles) in an amount of 90% by weight was blended with the amount of flux shown in Table 6 to prepare a paste solder. The resulting paste solders were evaluated with respect to printability, solderability, washability and time variability of viscosity. The results are summarized in Table 7, in which the Comparative Examples of paste solders are conventional water-soluble paste solders.

The various performance evaluation tests were carried out as follows.

Printability

Paste solder was printed on a base plate through a metal mask (0.2 mm thick). The appearance of printed patterns (spreading, skip, bridging, etc.) was visually inspected and evaluated as falling into one of three grades.

Solderability

Solder patterns printed on the base plate were heated to reflow, and wettability of solder and occurrence of solder balls were determined and evaluated as falling into one of three grades.

Ability of being washed off

After solder patterns printed on the base plate were heated to reflow, the base plate was dipped into warm water at 60° C. for 5 minutes and rinsed with warm water. The amount of flux residues was evaluated as falling into one of three grades to determine washability.

Furthermore, time variability of viscosity was determined by the difference in viscosity between the time when the paste solder was just prepared and one month later. It was evaluated as falling into one of three grades.

TABLE 6

| Formulation | This Invention Run No. | | | | Comparative Run No. | | |
|---|---|---|---|---|---|---|---|
| | 1 | 2 | 3 | 4 | 1 | 2 | 3 |
| Reaction Product-1 | 60 | | | | | | |
| Reaction Product-2 | | 60 | | | | | |
| Reaction Product-3 | | | 60 | | | | |
| Reaction Product-4 | | | | 60 | | | |
| Dimethylamine | 1.5 | 1.5 | 1.5 | 1.5 | | | |
| Malic Acid | 2 | 2 | 2 | 2 | | | |
| Urea | 2 | 2 | 2 | 2 | | | |
| Butyl Carbitol | 34.5 | 34.5 | 34.5 | 34.5 | | | |
| Polyethylene Glycol #1500 | | | | | 40 | | |
| Polyethylene Glycol #1000 | | | | | | 30 | |
| Polyethylene Glycol #600 | | | | | | 20 | |
| Dietylene Glycol | | | | | 20 | | |
| Diethanolamine | | | | | 10 | | |
| Glycerin | | | | | | | 47 |
| Lactic Acid | | | | | 5 | | 3 |
| Triethanolamine | | | | | 5 | | 20 |
| Zinc Chloride | | | | | | 60 | |
| Tragacanth Gum | | | | | | 2 | |
| Surfactant | | | | | | Slight | |
| Water | | | | | | 38 | |

TABLE 7

| Properties | This Invention Run No. | | | | Comparative Run No. | | |
|---|---|---|---|---|---|---|---|
| | 1 | 2 | 3 | 4 | 1 | 2 | 3 |
| Printability | O | O | O | O | Δ | X | Δ |
| Solderability | O | O | O | O | O | O | O |
| Washability | O | O | O | O | Δ | O | Δ |
| Time Variability of Viscosity | O | O | O | O | Δ | X | Δ |

Note O: Good, Δ: Fair, X: Poor

It is noted from the test results shown in Table 7 that the paste solder according to the present invention possesses printability, solderability, washability, and time variability which are all superior to those of the Comparative Examples. In particular, the washability and printability of the solder of the present invention are much superior to those of the Comparative Examples.

What is claimed is:

1. A soldering flux which comprises, as a main fluxing agent, a resinous reaction product of at least one-carboxyl-containing compound having 8 or less carbon atoms, selected from the group consisting of monocarboxylic acids, polycarboxylic acids, and hydroxy-carboxylic acids with tris(2,3-epoxypropyl)-isocyanurate, and an activating agent.

2. A soldering flux as set forth in claim 1 wherein the monocarboxylic acids are selected from the group consisting of formic acid, acetic acid, propionic acid, butyric acid, isobutyric acid, valeric acid, isovaleric acid, caproic acid, enanthic acid, and caprylic acid.

3. A soldering flux as set forth in claim 1 wherein the hydroxy-carboxylic acids are selected from the group consisting of glycolic acid, lactic acid, hydroxy-butyric acid, and hydroxy-valeric acid.

4. A soldering flux as set forth in claim 1 wherein the polycarboxylic acids are selected from the group consisting of oxalic acid, malonic acid, succinic acid, glutaric acid, adipic acid, pimelic acid, and suberic acid.

5. A soldering flux as set forth in claim 1 wherein at least one of malic acid, citric acid, tartaric acid, and hydroxy-malonic acid is used as the hydroxy-carboxylic acid and the polycarboxylic acid.

6. A soldering flux as set forth in claim 1 wherein the reaction product is expressed by the following general formula:

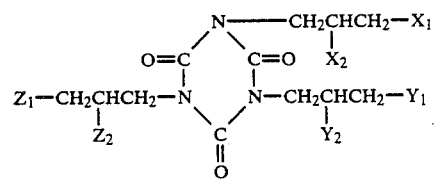

wherein one of $X_1$ and $X_2$ is a carboxylic acid residue (RCOO—) and the other one is an OH group, one of $Y_1$ and $Y_2$ is a carboxylic acid residue (RCOO—) and the other one is an OH group, and one of $Z_1$ and $Z_2$ is a carboxylic acid residue (RCOO—), and the other one is an OH group.

7. A soldering flux as set forth in claim 1 wherein the activating agent is selected from the group consisting of lactic acid, oleic acid, stearic acid, glutamic acid, phthalic acid, aniline hydrochloride, glutamic acid hydrochloride, bromine compounds, chlorine compounds, urea, and ethylenediamine.

8. A soldering flux as set forth in claim 1 wherein the flux is a preflux.

9. A paste solder which comprises a solder powder blended with a flux, said flux being a resinous reaction product of at least one carboxyl-containing compound having 8 or less carbon atoms, selected from the group consisting of monocarboxylic acids, polycarboxylic acids, and hydroxy-carboxylic acids with tris (2,3-epoxypropyl)-isocyanurate.

10. A paste solder as set forth in claim 9 wherein the monocarboxylic acids are selected from the group consisting of formic acid, acetic acid, propionic acid, butyric acid, isobutyric acid, valeric acid, isovaleric acid, caproic acid, enanthic acid, and caprylic acid.

11. A paste solder as set forth in claim 9 wherein the hydroxy-carboxylic acids are selected from the group consisting of glycolic acid, lactic acid, hydroxy-butyric acid, and hydroxy-valeric acid.

12. A paste solder as set forth in claim 9 wherein the polycarboxylic acids are selected from the group consisting of oxalic acid, malonic acid, succinic acid, glutaric acid, adipic acid, pimelic acid, and suberic acid.

13. A paste solder as set forth in claim 9 wherein at least one of malic acid, citric acid, tartaric acid, and hydroxy-malonic acid is used as the hydroxy-carboxylic acid and the polycarboxylic acid.

14. A paste solder as set forth in claim 9 wherein the reaction product is expressed by the following general formula:

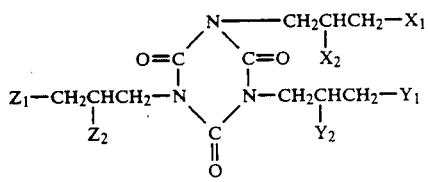

wherein one of $X_1$ and $X_2$ is a carboxylic acid residue (RCOO—) and the other one is an OH group, one of $Y_1$ and $Y_2$ is a carboxylic acid residue (RCOO—) and the other one is an OH-group, and one of $Z_1$ and $Z_2$ is a carboxylic acid residue (RCOO—) and the other one is an OH group.

15. A paste solder as set forth in claim 9 further comprising an activating agent which is selected from the group consisting of lactic acid, oleic acid, stearic acid, glutamic acid, phthalic acid, aniline hydrochloride, glutamic acid hydrochloride, bromine compounds, chlorine compounds, urea, and ethylenediamine.

16. A paste solder as set forth in claim 9 wherein the solder powder is selected from those of the solder alloys of Sn-Pb, Sn-Pb-Ag, Sn-Ag, Sn-Pb-Bi, and Pb-In.

17. A paste solder as set forth in claim 16 wherein the grain size of the solder powder is 200–400 mesh.